United States Patent
Cagle et al.

(10) Patent No.: US 6,543,004 B1
(45) Date of Patent: Apr. 1, 2003

(54) METHOD AND APPARATUS FOR ARCHIVING AND RESTORING DATA

(75) Inventors: John M. Cagle, Houston, TX (US); Gregory T. Noren, The Woodlands, TX (US); Kevin M. Jones, Tomball, TX (US); Mark R. Potter, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/363,512

(22) Filed: Jul. 29, 1999

(51) Int. Cl.[7] ................................. H04H 3/05
(52) U.S. Cl. ............................. 714/15; 714/7
(58) Field of Search ..................... 714/15, 16, 5, 714/6, 7, 8; 711/170, 112; 710/8, 10

(56) References Cited

U.S. PATENT DOCUMENTS

| | | | | |
|---|---|---|---|---|
| 5,544,347 A | * | 8/1996 | Yanai et al. ................. | 711/162 |
| 5,632,013 A | * | 5/1997 | Krygowski et al. ............ | 714/7 |
| 5,768,623 A | * | 6/1998 | Judd et al. ..................... | 710/17 |
| 5,832,274 A | * | 11/1998 | Cutler et al. ................. | 717/169 |
| 6,173,376 B1 | * | 1/2001 | Fowler et al. ............... | 711/162 |
| 6,311,232 B1 | * | 10/2001 | Cagle et al. ................... | 710/8 |

\* cited by examiner

*Primary Examiner*—Dieu-Minh Le
(74) *Attorney, Agent, or Firm*—Conley Rose, P.C.

(57) ABSTRACT

A computer system includes a first storage device, a backup storage device, and a system controller. The first storage device has a default operating system and a customized operating system stored therein. The backup storage device has at least archived configuration data stored therein. The system controller is adapted to replace the customized operating system with a restored operating system that is based on the default operating system. A method for restoring a computer system includes providing a first storage device having a default operating system stored therein. A backup storage device is provided having at least configuration data stored therein. The configuration data is transferred to the first storage device.

21 Claims, 4 Drawing Sheets

METHOD AND APPARATUS FOR ARCHIVING AND RESTORING DATA

BACKGROUND OF THE INVENTION

1. Field of the Invention

This invention relates generally to computer systems, and, more particularly, to a method and apparatus for archiving and restoring data in a computer system.

2. Description of the Related Art

A computer network is a connection of points (e.g., a plurality of computers) that have been interconnected by a series of communication paths. Moreover, any number of individual computer networks may be interconnected with other computer networks, which may increase the complexity of the overall system. Generally, computer networks may be used to increase the productivity of those computers that are connected to the network. For example, a computer connected to a network may communicate with other computers that are also connected to the network. Furthermore, the computer network may be used to share data, peripherals, or any other resources that are made available on the network.

The interconnection of the various points on the computer network may be accomplished using a variety of known topologies. For example, the most common computer network topologies include bus, star, and ring configurations. Furthermore, communication between the computers connected to the network may be accomplished using a variety of known protocols. For example, the connected computers may communicate using TCP/IP, SNA, and APPN.

Generally, a host computer (e.g., server) may function as a centralized point on the network. For example, using any of the network topologies discussed above, a plurality of client computers may be interconnected such that the server controls the movement of data across the network. The host computer may have an operating system that may be used to execute a server application program that is adapted to support multiple clients. Typically, the server may service requests from a plurality of client computers that are connected to the network. Furthermore, the server may be used to administer the network. For example, the server may be used to update user profiles, establish user permissions, and allocate memory space on the server for a plurality of clients connected to the network.

In many computer networks, a large amount of data may be stored on the server and accessed by the attached client computers. For example, each client computer may be assigned a variable amount of storage space on the server. The assigned storage spaces may be private (i.e., protected) or made available to other clients, and the assigned storage spaces may be used to store a variety of file types, such as documents, email messages, etc. Furthermore, the server may be used to save public data (i.e., data that does not necessarily have a specific owner but may be accessed by any number of clients.) For example, public folders (i.e., directories) may be created on the server, and the public folders may store data that relates to group projects, company information, or any other data that may require access from more than one client.

Unfortunately, as with many types of electronic equipment, problems may develop that require replacing an existing server in a computer network. Because the server may be essential to the operation of the network, it is important to minimize the time required to replace a faulty server with a new server. Generally, replacing a faulty server with a new server is made more difficult when large amounts of client data and public data is stored on the server. Furthermore, the problem may be exacerbated when a large number of client computers are connected to the network. In addition, transferring data (e.g., client data and public data) from a faulty server to a new server may require special technical expertise.

In addition to replacing the server, problems may develop that require reinstalling the operating system on the server. For example, the server may function poorly or become unresponsive. Often, reinstalling the operating system on the server requires special technical expertise that may result in further downtime of an existing network.

The present invention is directed to overcoming, or at least reducing the effects of, one or more of the problems set forth above.

SUMMARY OF THE INVENTION

In one aspect of the present invention, a computer system is provided. The computer system includes a first storage device, a backup storage device, and a system controller. The first storage device has a default operating system and a customized operating system stored therein. The backup storage device has at least archived configuration data stored therein. The system controller is adapted to replace the customized operating system with a restored operating system that is based on the default operating system.

In another aspect of the present invention, a method for restoring a computer system is provided. The method includes providing a first storage device having a default operating system stored therein. A backup storage device is provided having at least configuration data stored therein. The configuration data is transferred to the first storage device.

BRIEF DESCRIPTION OF THE DRAWINGS

The invention may be best understood by reference to the following description taken in conjunction with the accompanying drawings, in which like reference numerals identify like elements, and in which.

Figure 1:
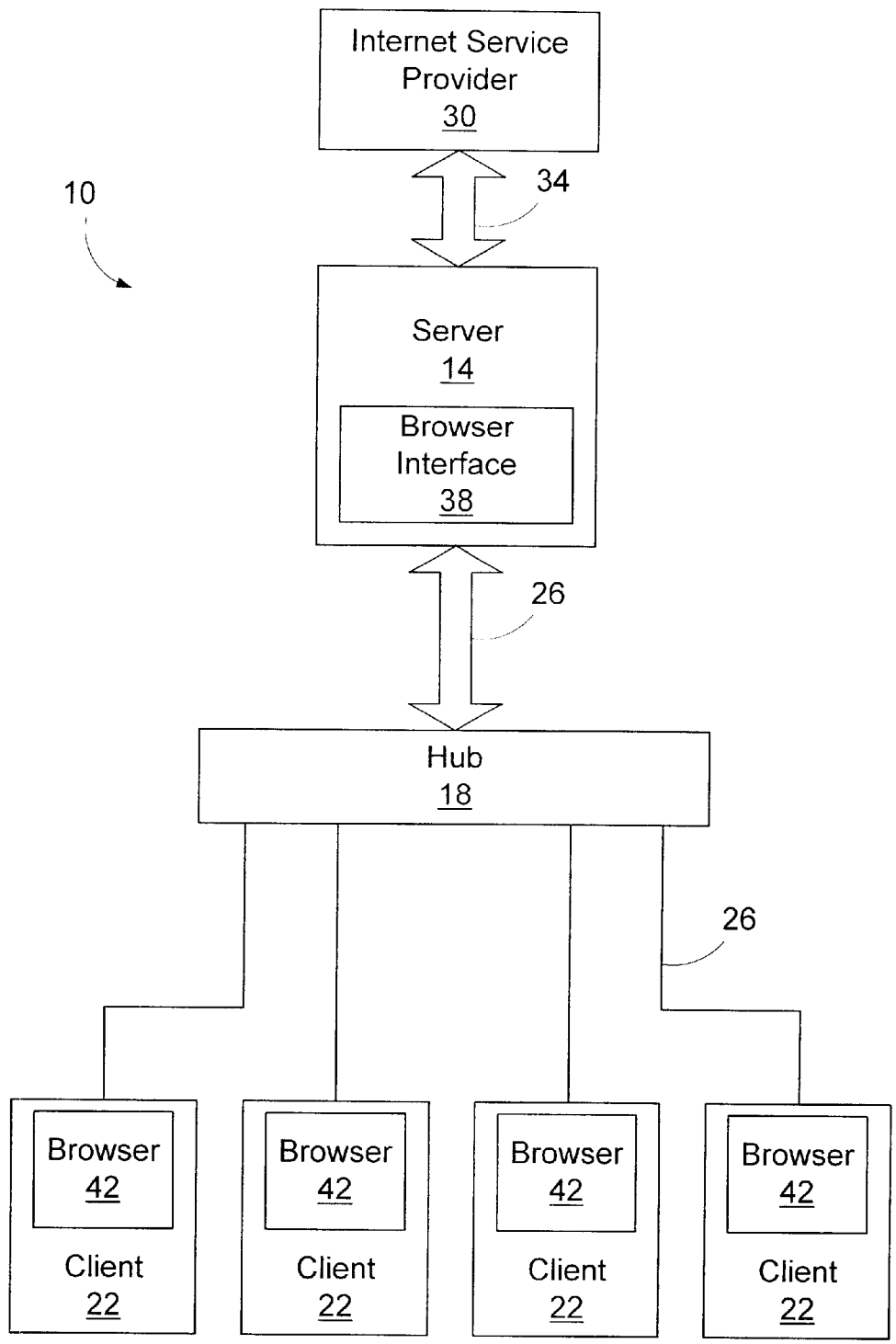
FIG. 1 is a simplified block diagram of a computer network having a server coupled to a plurality of clients.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a computer network 10 is shown. The computer network 10 may be configured using a variety of known topologies. For example, the computer network 10 may be configured as a ring, bus, or any other known method of interconnecting computers. In one embodiment, the computer network 10 is configured using a star topology and comprises a server 14, a hub 18, and a plurality of clients 22 that are coupled to the hub 18. It is contemplated that the hub 18 may comprise a variety of conventional switching or routing devices depending upon the particular application.

The hub 18 may be used as an intermediary between the server 14 and the clients 22. Generally, the hub 18 directs the flow of data between the server 14 and the clients 22. For example, each client 22 attached to the hub 18 may be identified by a unique address. Accordingly, based on the unique address, data may be routed from the server 14 to the appropriate client 22. Furthermore, the hub 18 may control the flow of data from the clients 22 to the server 14 (i.e., the hub 18 may be a bidirectional device.) Moreover, the hub 18 may operate in conjunction with the server 14 to transfer data between two clients 22.

Although only one hub 18 is shown in FIG. 1, it is contemplated that a plurality of hubs 18 may be included in the computer network 10, which may increase the number of clients 22 that may be attached to the network 10. For example, in one embodiment, each hub 18 may be coupled to seven clients 22. Once a hub 18 is at maximum capacity, an additional hub 18 may be attached to the filled hub 18 and seven additional clients 22 may be attached to the empty hub 18. It is contemplated that the network 10 may be designed to service any number of clients 22, and in one embodiment, three hubs 18 may be stacked, as described above, and the server 14 may be connected to twenty-five clients 22.

It is contemplated that a variety of protocols may be used to control the flow of data in the network 10. For example, the server 14 and the clients 22 may transfer data using TCP/IP, SNA, APPN, or any other protocol adapted to facilitate the movement of data. In one embodiment, transferring data between the server 14 and the clients 22 requires client software operating on the clients 22 and server software operating on the server 14. The client software and the server software cooperate to transfer data. For example, the sender (e.g., client 22, server 14, etc.) may encapsulate data into a packet. The packet may include any additional information (e.g., addresses, etc.) that may be necessary to successfully transmit the packet across the network 10 to a receiver (e.g., client 22, server 14, etc.) The receiver may decapsulate the packet, removing any undesired information. Once decapsulated, the data contained in the packet may be processed.

The clients 22 may be personal computers (PC). For example, the clients 22 may be IBM compatible PCs or Macintosh® computers. Moreover, each client 22 may include a network interface card (not shown) that provides the necessary hardware for data to be transferred in the network 10. In addition to the client software, each client 22 may include an operating system, such as Windows® 95/98, Windows®, NT, MAC OS7/8, etc.

The server 14 may be connected to the hub 18 using a network interface card (not shown.) As with any connection in the network 10, network interface cables 26 may be used to interconnect devices on the network 10. For example, the electrical connection between the server 14 and the hub 18 may be established using coaxial cable, twisted pair cable, fiber optic cable, or any other material conducive to carrying a signal. In addition, it is contemplated that the server 14 may be connected to an internet service provider (ISP) 30 using a variety of hardware configurations, such as ISDN, T1, etc. In one embodiment, the server 14 may be connected to the internet service provider 30 using a modem (not shown) and a connection to a local telephone line 34.

In one embodiment, the server 14 may be "headless", requiring remote service and administration. For example, the server 14 may be placed in the network 10 without being connected to a keyboard, monitor, mouse, or any other user input/output devices. Such a headless configuration is ideally suited for use in a setting where the server 14 is treated more as an appliance to enhance the network, rather than the central core of the network 10. For example, a small business using a simple peer-to-peer network 10 arrangement may wish to have additional services, such as email, centralized Internet access, common file storage and backup, file sharing, etc. Rather than using a more powerful, but more complicated, full-function server, the headless server 14 may be employed to provide the desired functionality without the overhead associated with the full-function server. Users of the headless server 14 may be less sophisticated computer users, and may desire an easily administered interface. To service or administer the server 14, the server 14 may include a browser interface 38. For example, the server 14 may be accessed by any of the attached clients 22 using a browser 42, such as Microsoft Internet Explorer, Netscape Navigator, etc.

The server 14 may be hard coded with a default IP address prior to being shipped to an end user. For example, the IP address 192.168.1.1 is a default dead net address from the Internet Assigned Numbers Authority (IANA) and may be used as an initial IP address. Once the network 10 is connected, the browser 42 that has been installed on the clients 22 may be directed to the default IP address that has been designated in the server 14. Using the browser 42, the clients 22 may access a simple to use browser interface 38 that has been preloaded in the server and contains a list of configuration options for the server 14. The browser interface 38 may include a simple to use graphical web page that allows the clients 22 to easily access and customize the configuration of the server 14.

In one embodiment, to simplify configuring the initial setup of the clients 22 (e.g., configuring the browsers 42 to access the browser interface 38), a companion disk comprising configuration software may be shipped with the server 14. The configuration software may be installed on the clients 22, simplifying the configuration of the individual browsers 42. Alternatively, it is contemplated that a network application program, such as TCP/IP, may be pre-installed on the clients 22 and the browsers 42 may be manually configured.

Figure 2:
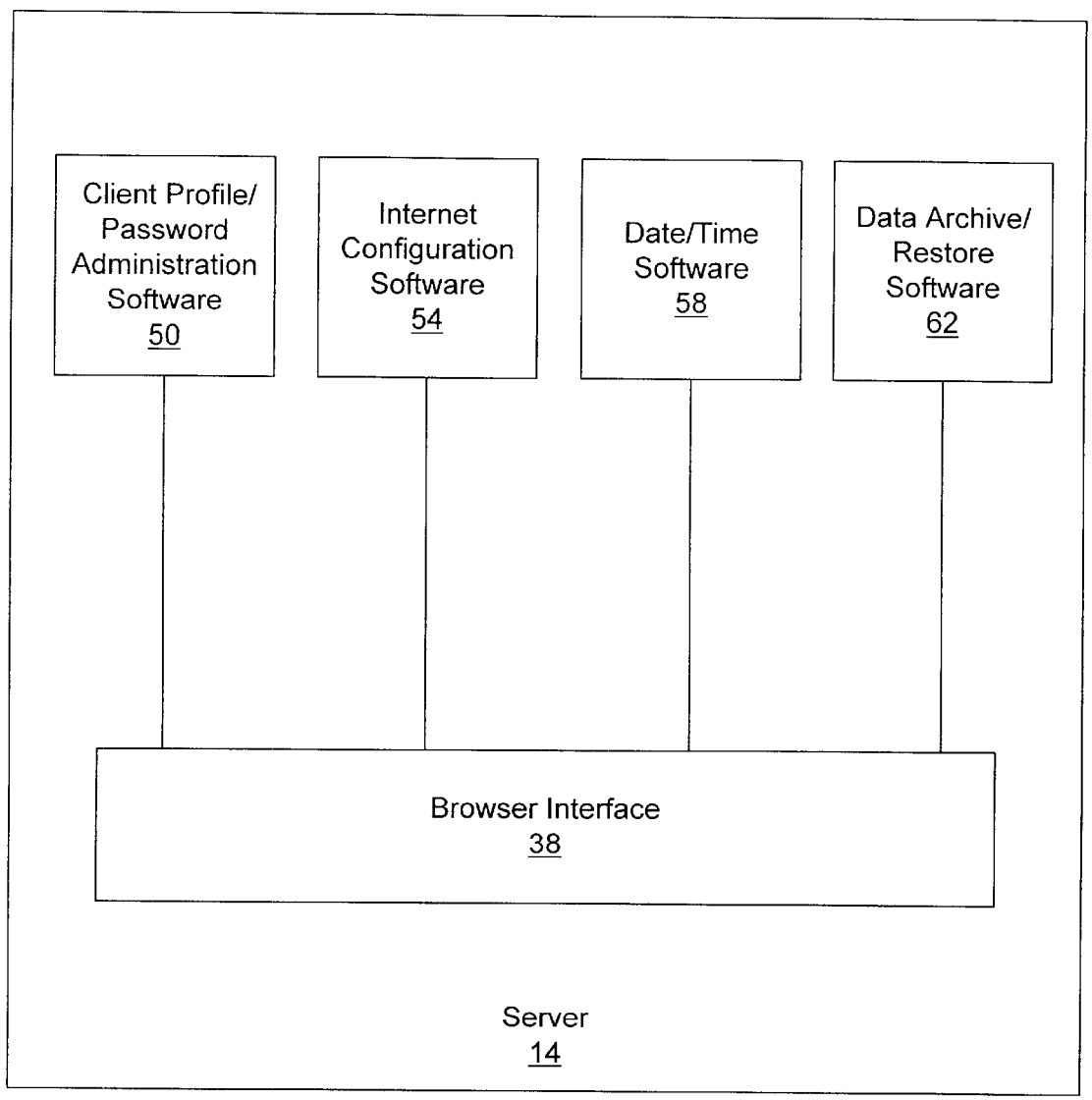
FIG. 2 is a diagram illustrating software applications executed by the server of FIG. 1.

Referring to FIG. 2, a block diagram illustrating examples of various administrative features that may be accessed using the browser interface 38 of the server 14, is provided. As described above, the browser interface 38 may be used in conjunction with the browsers 42 of the clients 22 to simplify the administration, configuration, and customization of the server 14. It is contemplated that, depending upon the particular application, additional features may be added and administered using the browser interface 38 described above. In one embodiment, the browser interface 38 installed on the server 14 may include client profile and password administration software 50, internet configuration software 54, date/time administration software 58, and data archiving and restoration software 62.

As illustrated above, the server 14 may be interconnected with the clients 22 in the network 10. Before the clients 22 may access resources available on the server 14, each user is identified by a user profile that may be protected with a user password. It is contemplated that the first client 22 connected to the network 10 may access the server 14 via its browser 42 and the browser interface 38 using an administration profile and password provided by the manufacturer. Once the administrator has accessed the server 14, the administration profile and password may be changed, and the other users may be assigned user profiles and passwords. User profiles and passwords may be added, deleted, and changed as often as desired. Moreover, any user that has accessed the server 14 using the administration profile and password may have access to the administrative features of the software 50, 54, 58, and 62 on the server 14.

As illustrated above, the server 14 may be connected to the internet service provider 30. Using the browser interface 38 and the administration profile and password, the clients 22 may access and configure the server 14 with the appropriate internet settings. For example, internet account information from the internet service provider 30 may be designated in the server 14, email server addresses may be initialized, and internet permissions assigned. Depending upon the desired internet usage, individual users may be granted internet access while others users connected to the network 10 may be denied internet access.

The date/time administration software 58 may allow the user to access the current date, time, and timezone set for the server 14 by the manufacturer. Since this is likely not correct for the majority of users, the browser interface 38 and the administration profile and password may allow the user to reset these values appropriately for their particular locale.

Figure 3:
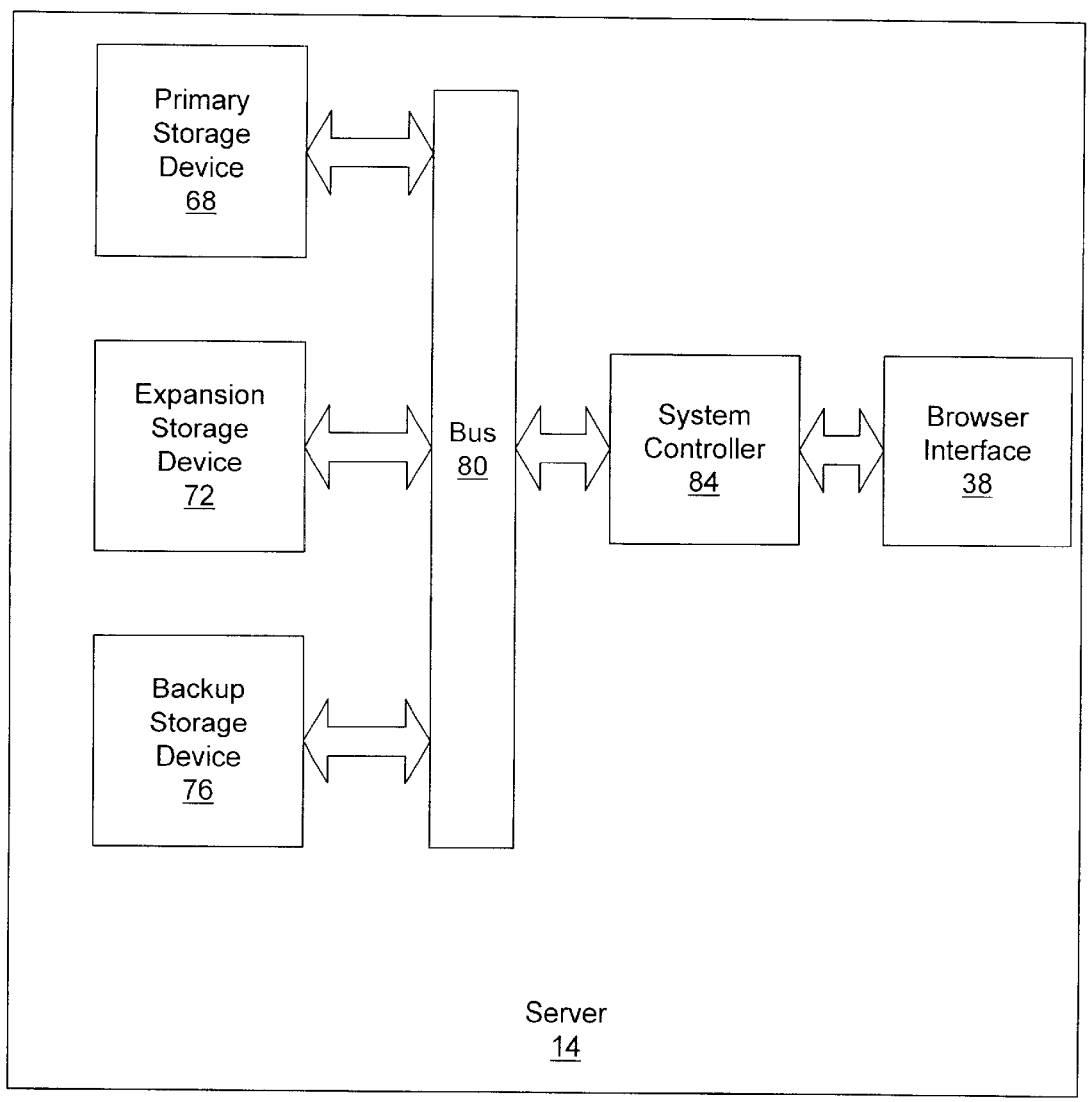
FIG. 3 is a simplified block diagram of the server of FIG. 1 illustrating data storage and retrieval functions in accordance with one embodiment of the present invention.

The data archiving and restoration software 62 may be accessed using the browser interface 38 and may be understood with reference to FIG. 3. FIG. 3 is a block diagram of the server 14, illustrating the operation of the data archiving and restoration software 62. The server 14 includes a primary storage device 68, an expansion storage device 72, a backup storage device 76, a bus 80, and a system controller 84. The storage devices 68, 72, and 76 may be coupled to the bus 80, and the system controller 84 may control the flow of data between the clients 22 and the storage devices 68, 72, and 76. Moreover, the system controller 84 may control the flow of data between the individual storage devices 68, 72, and 76.

The system controller 84 may be comprised of a variety of known devices. For example, the system controller 84 may be a microprocessor, microcontroller, or any other type of control logic. It is contemplated that the primary storage device 68 may be comprised of a variety of nonvolatile memory devices. Moreover, the storage capacity of the primary storage device 68 may be varied as a matter of design choice, and in one embodiment, the primary storage device 68 is a 6-gigabyte hard disk drive.

The primary storage device 68 may be used to save client data, system configuration settings, a factory fresh copy of the server operating system, or any other appropriate data. Client data may include files placed on the primary storage device 68 by any one of the attached clients 22. For example, depending upon the configuration, each client 22 connected to the server 14 may create a user folder on the primary storage device 68. Once the user folders are created, the clients 22 may store data, such as documents, email messages, etc., on the primary storage device 68. System configuration settings may include any changes made to the factory configuration of the server 14. For example, the primary storage device 68 may save user names and passwords, internet service configurations, the current date and time, and, as will be described below, the data archive schedule. The factory fresh copy of the operating system may be used to alleviate problems that may be associated with the server 14. As will be illustrated below, the factory fresh copy of the operating system may be reinstalled on the server 14 to return the server 14 to a factory fresh configuration, erasing customized settings such as, user names, passwords, ISP configuration, etc.

The expansion storage device 72 may be comprised of a variety of nonvolatile memory devices. Moreover, the storage capacity of the expansion storage device 72 may be varied as a matter of design choice, and in one embodiment, the expansion storage device 72 is a 6.4-gigabyte removable hard disk drive. The expansion storage device 72 may be used to extend the overall data storage capacity of the server 14. For example, the expansion storage device 72 may function as an extension of the primary storage device 68 and may store the same types of data (e.g., client data, system configuration settings, etc.).

The system controller 84 may determine the allocation of storage space between the primary storage device 68 and the expansion storage device 72. For example, in one embodiment, the clients 22 have access to both the primary storage device 68 and the expansion storage device 72, and the clients 22 determine whether to save client data on the primary storage device 68 or the expansion storage device 72. Alternatively, the system controller 84 may automatically store the system configuration data and the copy of the operating system on the primary storage device 68. Furthermore, although only one expansion storage device 72 is shown, it is contemplated that the expansion storage device 72 may be comprised of a plurality of removable hard disk drives or other nonvolatile memory devices.

The data archiving and restoration software 62 may be used to backup data stored on the primary and expansion storage devices 68, 72. Using the browser interface 38, a data archive schedule may be configured to automatically archive the data saved on the primary and expansion storage devices 68, 72 onto the backup storage device 76. For example, using the administration profile and password, the clients 22 may access the configuration settings of the server 14 and select an automated backup schedule. In one embodiment, the archive schedule may be set to backup the primary and expansion storage devices 68, 72 once a day at a particular time, or alternatively, the archive schedule may be selected to run once a week at a particular time. It is contemplated that other archive schedules may be configured and adapted, depending upon the particular application.

In another embodiment, the primary and expansion storage devices 68, 72 may be archived manually. For example, rather than having an automated schedule, the backup routine may be started manually by the clients 22 using the browser interface 38. For example, using easy to operate "push buttons" in software, the clients 22 may direct their browsers 42 to the browser interface 38 of the server 14 and initiate the backup routine.

The backup storage device 76 may be comprised of a variety of nonvolatile memory devices. For example, the backup storage device 76 may be comprised of an 8.4-gigabyte removable hard disk drive. Because the backup storage device 76 may be removable, it is contemplated that a plurality of backup storage devices 76 may be used on a rotating schedule. For example, two hard disk drives may be used to backup the primary and expansion storage devices 68, 72. In one illustrative embodiment, the first hard disk drive may be used on Monday, Wednesday, and Friday, and the second hard disk drive may be used on Tuesday and Thursday. Because the archived data may be stored on more than one disk, alternating backup storage devices 76 may reduce the risk of losing data. It is contemplated that other archiving schemes may be used, requiring any number of backup storage devices 76.

It is contemplated that a variety of known compression algorithms may be used during the backup routine to maximize the storage capacity of the backup storage device 76. In one embodiment, the data stored on the primary and expansion storage devices 68, 72 is compressed and transferred as a mirror image to the backup storage device 76. For example, the file structure of the primary and expansion storage devices 68, 72, such as directory names and file names, may remain unchanged on the backup storage device 76. In addition, rather than arbitrarily transferring all files to the backup storage device 76, only those files that have changed between scheduled archives are updated. In one embodiment, the system controller 84 may compare the contents of the backup storage device 76 with the contents of the primary and expansion storage devices 68, 72, and based on the comparison, only update the backup storage device 76 with data that has changed. For example, if between scheduled archives, a new client is added to the configuration of the server 14, the new client profile, password, and other related data may be detected by the system controller 84 and archived on the backup storage device 76. By only updating those files that have changed between scheduled archives, the backup routine may operate more efficiently and consume less time.

The backup storage device 76 may be used to restore the primary and expansion storage devices 68, 72. For example, if the data stored on the primary storage device 68 or the expansion storage device 72 is corrupted or lost, the data archived on the backup storage device 76 may be used to replace the lost or corrupted data. Moreover, it is contemplated that the backup storage device 76 may be used to restore system configuration settings, user data, internet configurations, or any other data that has been archived on the backup storage device 76.

In one embodiment, an automatic restore may be initiated by the clients 22, using the browser interface 38. For example, using the administrator profile and password and easy to operate "push buttons" in software, the clients 22 may direct their browsers 42 to the browser interface 38 of the server 14 and initiate the automatic restore. Once initiated, the system controller 84 may automatically transfer files and directories from the backup storage device 76 to the primary and expansion storage devices 68, 72. Using the automatic restore, user data and system settings, such as user profiles, passwords, internet configurations, data backup schedules, etc., may be automatically restored with the data and system configuration settings archived on the backup storage device 76.

As illustrated above, in one embodiment, the data stored on the primary storage device 68 and the expansion storage device 72 is mirrored and stored in a compressed format on the backup storage device 76. Because file structure, such as directory paths and file names, may remain the same on the backup storage device 76, the clients 22 may easily filter through and view the archived data. In one embodiment, rather than performing a complete restore of the server 14, the clients 22 may selectively restore individual files that are archived on the backup storage device 76. For example, system settings, such as user profiles, passwords, internet configurations, data backup schedules, etc., may be restored without restoring other archived data. Moreover, client files (e.g., documents, email messages, etc.) may individually be restored as needed.

Figure 4:
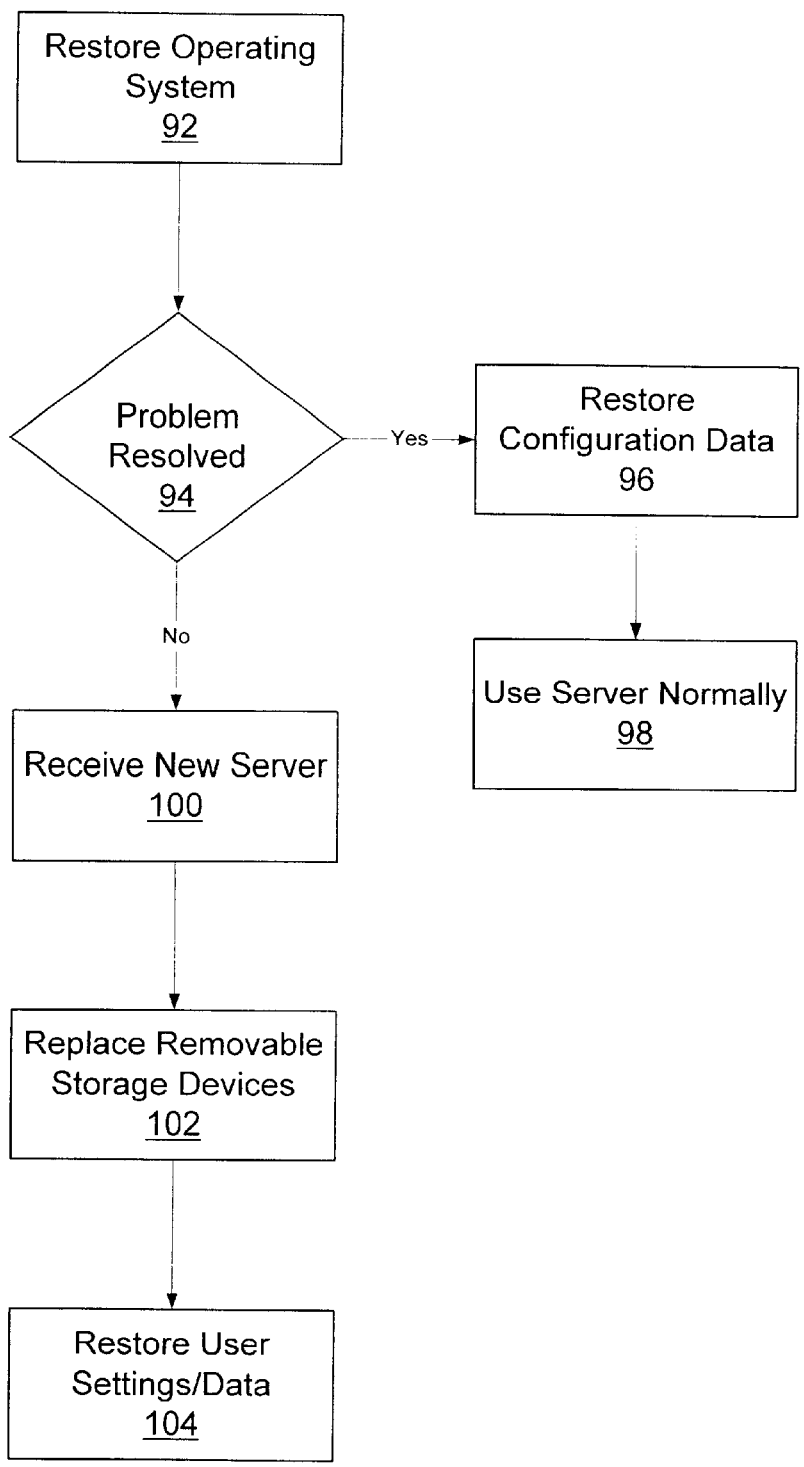
FIG. 4 is a flow chart illustrating the data storage and retrieval of FIG. 3.

Referring to FIG. 4, a flow chart 88 of one illustrative method of restoring the system settings and user data from a first server (not shown) to a second server (not shown) in accordance with the present invention is provided. Although the method provided in FIG. 4 is described in reference to the computer network 10, the application of the present invention may be applied to a variety of computer systems.

At block 92, the first server may be connected to the network 10 and for one reason or another problems may develop with its operation. For example, the first server may function poorly in the network, generate errors, or the first server may cease to operate. If a problem occurs, in an attempt to correct the problem, the operating system of the first server may be restored to a factory fresh default condition, in block 92, which allows for a clean start from a known "good" condition. For example, the clients 22, using the administrator profile and password, may access the server 14 through their browsers 42, and using simple "push buttons" in software, the clients 22 may automatically restore the copy of the operating system saved on the primary storage device 68. Because restoring the operating system of the first server may be a complicated undertaking for the average user, restoring the operating system may require contacting technical support provided by the computer manufacturer. Furthermore, it is contemplated that the operating system of the first server may be restored to a factory fresh default condition at any time. For example, in one embodiment, the operating system of a previously used server 14 may be restored to a factory fresh default condition before being placed in a new application.

In one embodiment, restoring the operating system of the first server may remove any customized configurations, such as user profiles, passwords, etc., but may not affect user data stored on the primary, expansion, and backup storage devices 68, 72, 76. For example, user files, such as documents, email messages, etc., may be unaffected by restoring the operating system. Once the operating system is restored from the primary storage device 68, the user profiles and passwords may be reconfigured using the browser interface 38, and the configured clients 22 may access their user data.

In block 94, once the operating system of the first server is restored, the first server may be evaluated to determine whether restoring the operating system to its factory fresh default condition corrected the problems described above. If the first server appears to be operating correctly, the configuration data of the operating system may be restored, in block 96. For example, as will be described below, the configuration data archived on the backup storage device 76 may be used to update the restored operating system, and the restored operating system may be substantially returned to its customized configuration. Furthermore, once updated, in block 98, the first server may be placed back into normal operation.

Alternatively, at block 100, after several failed tries to repair a particular problem experienced with the first server, the second server may be sent by the computer manufacturer to replace the first server in the computer network 10. Once received, the first server may be disconnected, and the second server may be connected to the computer network 10.

At block 102, the backup storage device 76 of the second server may be replaced with the backup storage device 76 of the first server. As illustrated above, the backup storage devices 76 of the first and second servers may be removable hard disk drives that are easily swapped with one another. Those skilled in the art will appreciate that prior to switching the backup storage devices 76 of the first and second servers it is necessary to have an archived copy of the contents of the primary and expansion storage devices 68, 72 of the first server. For example, as will be illustrated below, the contents of the backup storage device 76 of the first server may be restored onto the second server. In one embodiment, the expansion storage devices 72 of the first and second servers may also be removable hard disk drives that may be swapped with one another. Alternatively, as will be illustrated below, the primary storage devices 68 may not be swapped and a complete restore of the second sever may be performed.

At block 104, the backup storage device 76 of the first server may be restored onto the second server. By restoring data from the backup storage device 76 of the first server onto the second server, the second server may be updated with substantially the same customized configurations as the first server and substantially the same user data as the first server. For example, system configurations, such as user profiles, passwords, archive schedules, etc., may be restored onto the primary storage device 68 of the second server. Furthermore, user data, such as documents, email messages, etc., may be restored onto the second server in substantially the same way they were saved on the first server. For example, file structure, such as directory path hierarchy and file names, may remain unchanged on the second server. Moreover, data stored on the primary storage device 68 of the first server may now by saved on the primary storage device 68 of the second server, and data stored on the expansion storage device 72 of the first server may now be saved on the expansion storage device 72 of the second server.

It is contemplated that a complete or a partial restore of the backup storage device 76 may be performed. In one embodiment, a complete restore of the second server requires restoring the primary and expansion storage devices 68, 72 of the second server from the backup storage device 76 of the first server. Alternatively, as discussed above, the expansion storage devices 72 of the first and second servers may be swapped requiring only the primary storage device 68, of the second server to be restored. For example, because the data stored on the expansion storage device 76 of the first server is now accessible by the second server, it is unnecessary to restore the expansion storage device 72.

The clients, using the administrator profile and password, may access the server 14 through their browsers 42, and using simple "push buttons" in the browser interface 38, the clients 22 may restore the second server. As illustrated above, the clients 22 may view the contents of the backup storage device 76 and, depending upon the application, execute a complete restore, a partial restore, or a selective restore of individual files.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A server, comprising:
    a first storage device contained in the server and having a default operating system and a customized operating system stored therein;
    a backup storage device contained in the server and having at least archived configuration data and archived user data stored therein;
    a system controller contained in the server and adapted to replace the customized operating system with a restored operating system, the restored operating system being based on the default operating system; and
    an expansion storage device contained in the server and having a plurality of user data stored therein;
    wherein the archived user data stored in the backup storage device comprises a first set of data originating from the first storage device and a second set of data originating from the expansion storage device; and
    wherein the system controller also is adapted to determine the origination of the first and second sets of data and restore the first set of data onto the first storage device and the second set of data onto the expansion storage device.

2. The computer system of claim 1, wherein the system controller is adapted to receive input from a browser interface and replace the customized operating system with the restored operating in response to the input from the browser interface.

3. The computer system of claim 1, wherein the system controller is adapted to restore the archived configuration data from the backup storage device onto the first storage device.

4. The computer system of claim 3, wherein the system controller is adapted to update the restored operating system with the archived configuration data.

5. The computer system of claim 1, wherein the system controller is adapted to receive input from a browser interface and restore the archived user data from the backup storage device onto the first storage device in response to the input from the browser interface.

6. The computer system of claim 1, wherein the system controller is adapted to receive input from a browser interface, and restore the first and second sets of data onto the first storage device and the expansion storage device respectively in response to the input from the browser interface.

7. A method for restoring a server comprising:
    providing a first storage device in the server having a default operating system stored therein;
    providing an expansion storage device in the server;
    providing a backup storage device in the server having at least configuration data and user data stored therein; and
    transferring the configuration data to the first storage device;
    wherein the user data stored in the backup storage device comprises a first set of data originating from the first storage device and a second set of data originating from the expansion storage device;

the method also including determining the origination of the first and second sets of data and restoring the first and second sets of data onto the first storage device and the expansion storage device respectively.

8. The method of claim 7, further comprising restoring the default operating system of the computer system.

9. The method of claim 8, wherein the computer system is adapted to receive input from a browser interface, and the operating system is restored in response to the input from the browser interface.

10. The method of claim 8, further comprising administering the computer system using the browser interface.

11. The method of claim 10, wherein administering the computer system comprises reconfiguring user profiles and passwords to provide access to user data.

12. The method of claim 8, wherein restoring the default operating system comprises replacing a customized operating system with a restored operating system, the restored operating system being based on the default operating system.

13. The method of claim 12, wherein transferring the configuration data to the first storage device comprises updating the restored operating system with the configuration data.

14. The method of claim 13, wherein updating the restored operating system with the configuration data comprises configuring the restored operating system to be substantially the same as the customized operating system.

15. The method of claim 12, wherein the server is adapted to receive input from a browser interface, and the user data is restored in response to the input from the browser interface.

16. The method of claim 7, further comprising removing the backup storage device from a first server and installing the backup storage device in a second server.

17. The method of claim 16, further comprising restoring the configuration data of the first server onto the second server.

18. The method of claim 17, wherein the first server has a customized operating system and restoring the configuration data comprises updating an operating system of the second server, the updated operating system of the second server being based on the customized operating system of the first server.

19. The method of claim 16, further comprising restoring user data from the first server onto the second server, the user data being stored on the backup storage device and subsequently transferred to the second server.

20. The method of claim 19, further comprising administering the second server using the browser interface.

21. The method of claim 20, wherein administering the second server comprises reconfiguring user profiles and passwords to provide access to user data.

* * * * *